(12) United States Patent
Kim et al.

(10) Patent No.: US 7,520,436 B2
(45) Date of Patent: Apr. 21, 2009

(54) SLIDE MODULE FOR SLIDE TYPE PORTABLE TERMINAL AND COVER APPARATUS FOR EXTERNAL TYPE CARD MOUNTED THERETO

(75) Inventors: Jae-Shik Kim, Seongnam-si (KR); Hong-Bae Kim, Yongin-si (KR); Chul-Woong Kim, Seoul (KR); Sue-Kyoung Chin, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 11/371,435

(22) Filed: Mar. 9, 2006

(65) Prior Publication Data

US 2006/0231620 A1    Oct. 19, 2006

(30) Foreign Application Priority Data

Apr. 18, 2005    (KR)    ...................... 10-2005-0031943

(51) Int. Cl.
  *G06K 7/00*    (2006.01)
(52) U.S. Cl. ...................... 235/486; 439/218
(58) Field of Classification Search ................ 235/486, 235/483, 492; 379/433.01, 428.02; 361/727, 361/679; 439/218, 630
  See application file for complete search history.

(56) References Cited

U.S. PATENT DOCUMENTS

| | | | |
|---|---|---|---|
| 5,894,597 A * | 4/1999 | Schwartz et al. ............ 455/558 |
| 6,471,550 B2 * | 10/2002 | Maiterth et al. ............. 439/631 |
| 6,822,871 B2 * | 11/2004 | Lee et al. ..................... 361/727 |
| 6,961,593 B1 * | 11/2005 | Lonka et al. ................. 455/573 |
| 7,231,039 B2 * | 6/2007 | Gronroos et al. ........ 379/428.02 |
| 7,356,363 B2 * | 4/2008 | Park et al. ................. 455/575.4 |
| 2004/0198437 A1 * | 10/2004 | Yamamoto et al. ........ 455/556.1 |
| 2005/0141686 A1 * | 6/2005 | Matsunaga et al. ...... 379/142.01 |
| 2005/0164753 A1 * | 7/2005 | Kato ........................ 455/575.4 |
| 2005/0208985 A1 * | 9/2005 | Park et al. ................. 455/575.4 |
| 2007/0089311 A1 * | 4/2007 | Amundson et al. ........ 33/355 R |
| 2008/0090627 A1 * | 4/2008 | Jeong et al. .............. 455/575.4 |

FOREIGN PATENT DOCUMENTS

| | | | |
|---|---|---|---|
| CN | 1177896 | 4/1998 | |
| CN | 2681471 | 2/2005 | |
| KR | 20040080170 | * 10/2004 | .................. 455/558 |

* cited by examiner

*Primary Examiner*—Thien M Le
(74) *Attorney, Agent, or Firm*—The Farrell Law Firm, PC

(57) ABSTRACT

A slide module of a slide type portable terminal which constitutes a slim slide module in a slide type housing and a cover apparatus for an external type card mounted to the slide module are disclosed. A slide module of a slide type portable terminal having a body housing and a slide housing for opening and closing the body housing when slid includes: a guide member; a slide member receiving the guide member in an inner side thereof in an opposed manner and engaged with both sides of the guide member so as to slide; and a force providing means provided between the members, for providing a force to slidably move the slide member.

24 Claims, 18 Drawing Sheets

SLIDE MODULE FOR SLIDE TYPE PORTABLE TERMINAL AND COVER APPARATUS FOR EXTERNAL TYPE CARD MOUNTED THERETO

PRIORITY

This application claims priority to an application entitled "SLIDE MODULE FOR SLIDE TYPE PORTABLE TERMINAL AND COVER APPARATUS FOR EXTERNAL TYPE CARD MOUNTED THERETO" filed in the Korean Industrial Property Office on Apr. 18, 2005 and assigned Serial No. 2005-31943, the contents of which are incorporated herein by reference.

BACKGROUND OF THE INVENTION

1. Field of the Invention

The present invention relates to a slide module of a slide type portable terminal having an external type card cover exposed and concealed to and from the outside of the terminal during the slidable movement thereof and a cover apparatus for an external type card mounted to the slide module.

2. Description of the Related Art

Generally, portable communication devices are devices by which radio communications are performed, and are sorted into various types according to their shapes. For example, portable communication devices are sorted into a bar type, a flip type, and a folder type portable terminal according to their shapes. The bar type terminal has a single bar-shaped housing, the flip type terminal has a bar-shaped housing and a flip rotatably engaged by a hinge unit, and the folder type terminal has a folder rotatably connected to a bar-shaped housing by a hinge unit.

Further, portable communication devices are also sorted into a rotation type and a slide type terminal according to their opening/closing methods. The rotation type terminal is opened and closed whereby two housings are rotatably connected so as to be opposite to each other. The slide type terminal is opened and closed whereby two housings are opposite to each other when a housing is moved in a lengthwise direction. The variously sorted portable communication terminals will be understood by those skilled in the art.

As shown in FIGS. 1 and 2, in the slide type portable terminal 1 having a main body 2 including a plurality of key pads 2a and a microphone unit 2b, a slide body 3 is slid by about half of the length of the main body 2 to open the portable terminal. Generally, a 3×4 key pad is installed on the main body 2, and a speaker unit 3a and a display unit 3b can be installed on the front surface of the slide body 3.

According to the conventional slide type portable terminal, a main plate (not shown) is provided in the main body and a slide plate (not shown) is provided in the slide body, and since the plates are engaged so as to be opposite to each other, the size of the terminal becomes larger due to the thickness of the plates, hampering the miniaturization of the terminal.

A structure of a slide type portable communication device is described in detail in Korean Patent No. 2002-71911, assigned to the assignee of the present application. However, according to the slide type potable communication device disclosed in this patent, the upper and lower housings are thick, and are disadvantageous with respect to slimming the portable device, hampering a good gripping feeling and restricting the appearance of its design.

Conventional slide type portable communication devices have varied functions according to desires of consumers. The size of the devices are being miniaturized, and voice communication and radio listening becomes possible. Further, MP3 music and moving images can be downloaded by connecting to the internet. However, since the music and moving image files are big and the memory capacity is large, a separate memory card, i.e., an external card, is needed, and an engaging device must be provided in the body of the terminal to mount the external card.

However, since the engaging device of the conventional external card is mounted to the body of the terminal so as to be exposed to the outside, the appearance of the terminal is not good. Further, since a separate space must be provided in the terminal, the size of the terminal becomes larger.

SUMMARY OF THE INVENTION

Accordingly, the present invention has been made to solve the above-mentioned problems occurring in the prior art, and an object of the present invention is to provide a slide module for a slide type portable terminal which includes a slim slide module in a slide type housing to facilitate the opening/closing operation of the housing and make the terminal slimmer.

It is another object to provide a slide module of a slide type portable terminal which includes an external type card cover exposed and concealed to and from the outside of the terminal according to the slide movement of the module provided in the slide type housing, enhancing the appearance of the terminal and miniaturizing the terminal.

In order to accomplish the above objects of the present invention, according to the first preferred embodiment of the present invention, a slide module of a slide type portable terminal having a body housing and a slide housing for opening and closing the body housing during the slide movement includes: a guide member; a slide member receiving the guide member in an inner side thereof in an opposite manner and engaged with both sides of the guide member for sliding movement; and a force providing means provided between the guide member and the slide member, for providing a force to slide the slide member.

According to the second preferred embodiment of the present invention, a cover apparatus for an external type card mounted to a slide module of a slide type portable terminal having a body housing and a slide housing for opening and closing the body housing during the slide movement includes: a slide module comprising a guide member, a slide member receiving the guide member in an inner side thereof in an opposite manner and engaged with both sides of the guide member for sliding movement, and a force providing means provided between the slide and guide members, for providing a force to slidably move the slide member; an external type card cover mounted to the slide module, and exposed and concealed to and from the outside of the terminal as the module is slid; a cover hinge unit rotatably engaging the external type card cover and opening and closing a socket provided in the slide housing as the cover is rotated about a hinge axis; and a cover locking unit for restricting the rotation of the external card cover and releasing the restriction.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a first preferred embodiment of the present invention will be described in detail with reference to the accompanying drawings.

Figure 1:
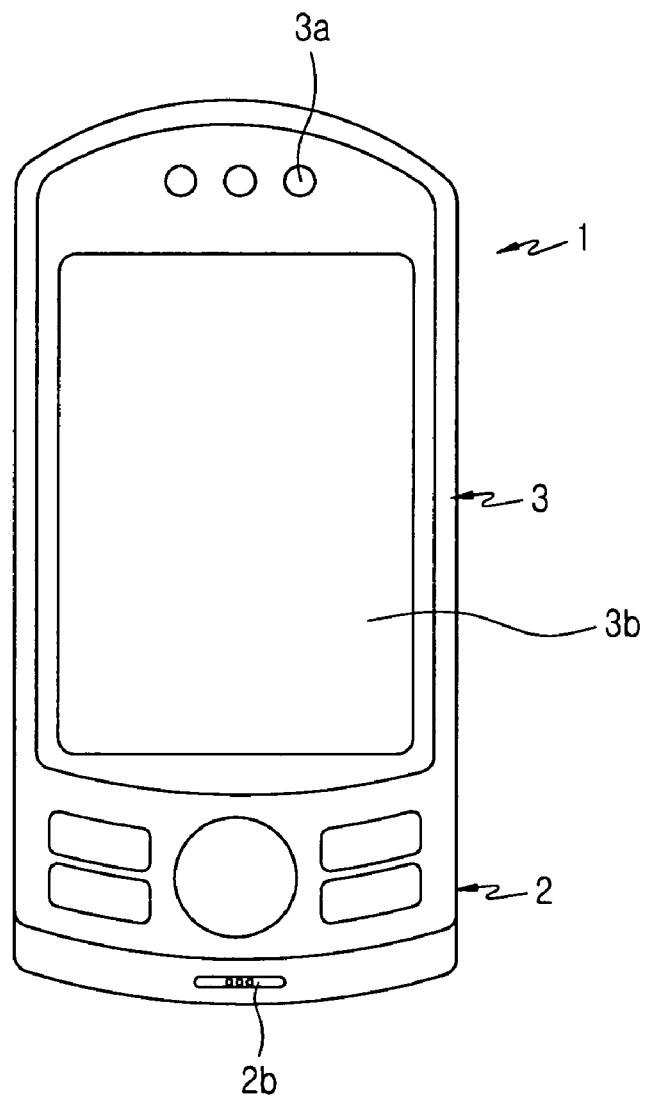
FIG. 1 is a front view for showing a state before the operation of a conventional slide type portable terminal.
Figure 2:
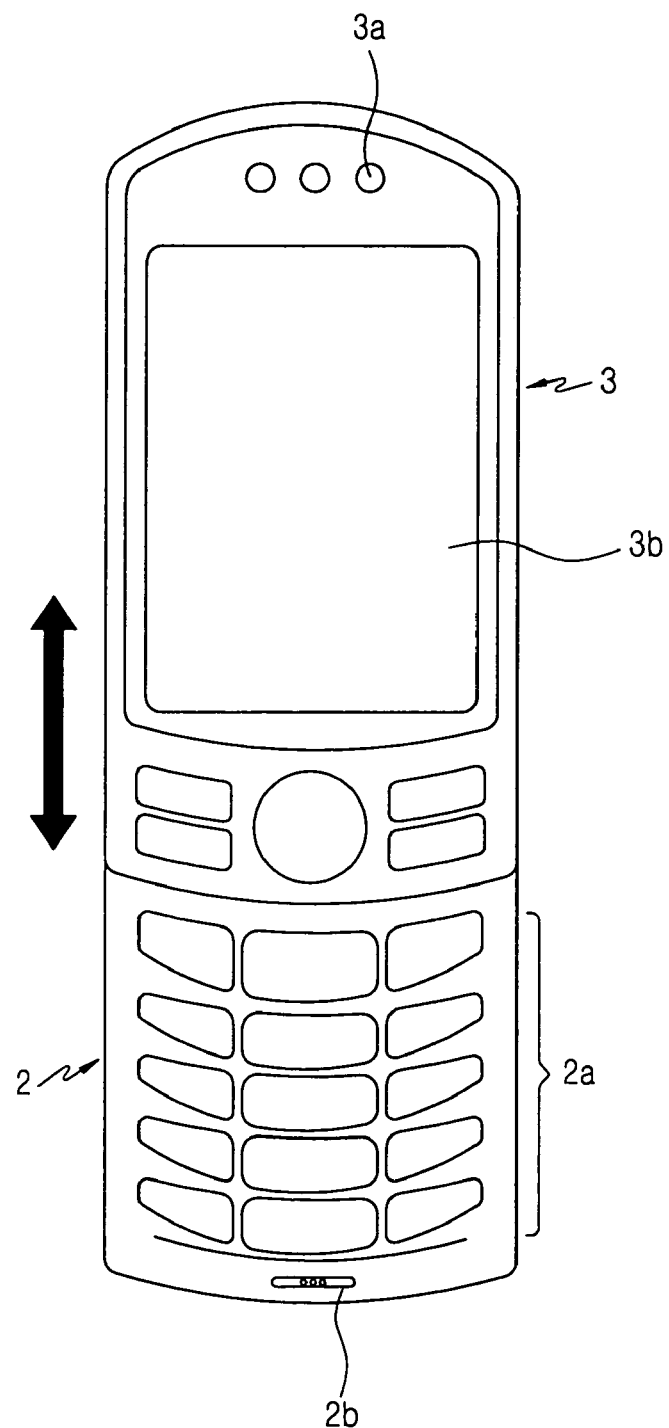
FIG. 2 is a front view for showing a state after the operation of a conventional slide type portable terminal.
Figure 3:
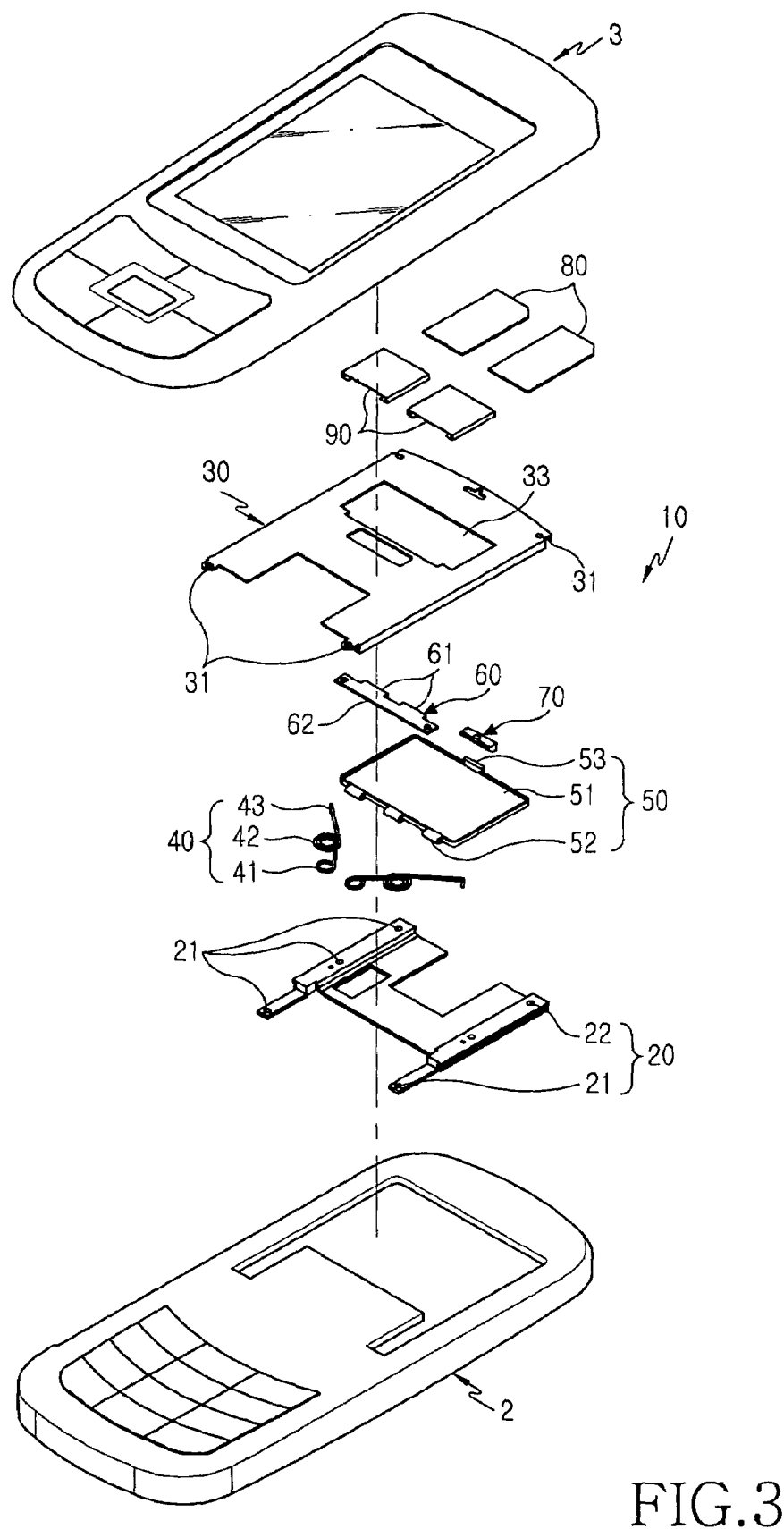
FIG. 3 is an exploded perspective view showing the structures of a slide module of a slide type portable terminal and a cover apparatus of an external type card mounted thereto according to the present invention.
Figure 4:
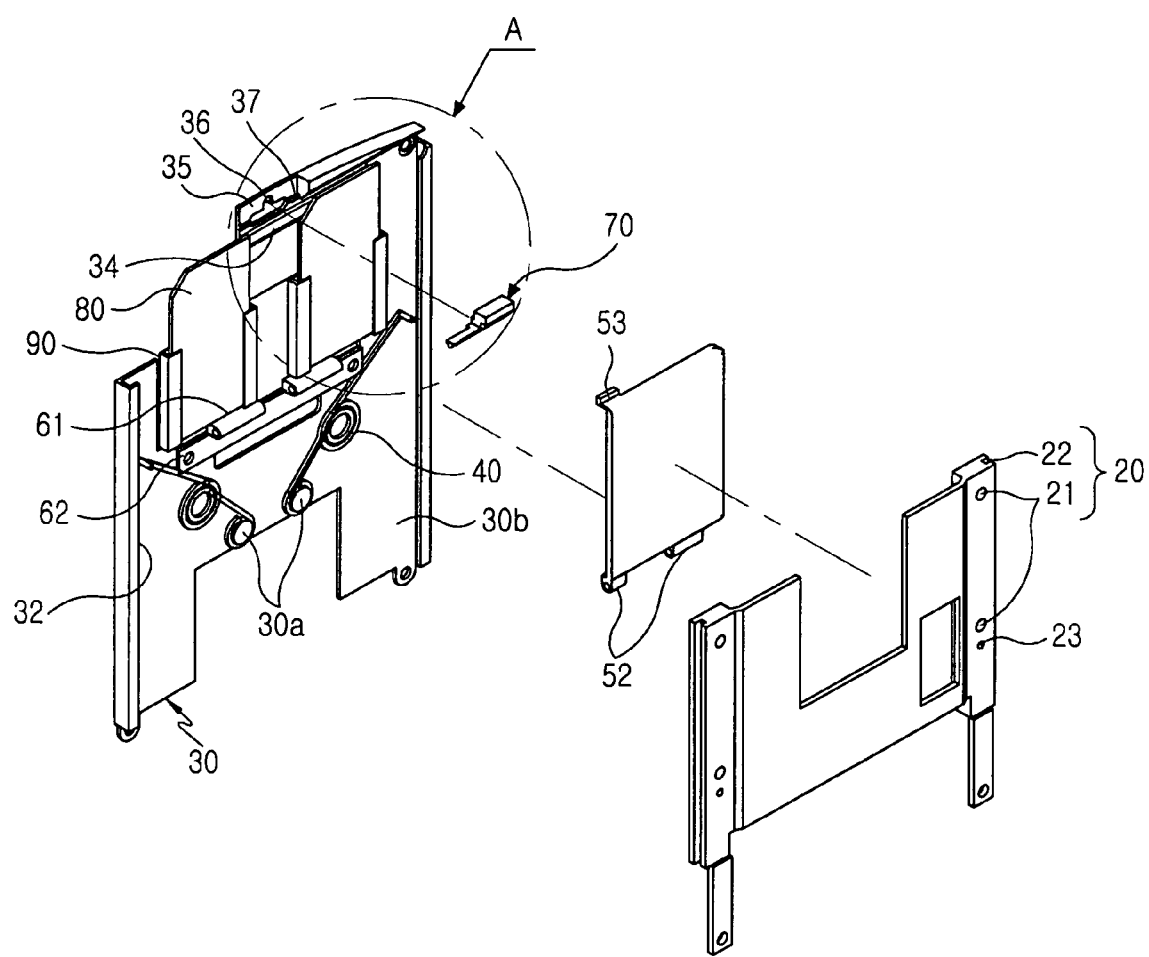
FIG. 4 is an exploded perspective view showing the state before a slide module of a slide type portable terminal and a cover apparatus of an external type card mounted thereto according to the present invention are assembled.

As shown in FIGS. 3 and 4, a slide module 10 of a portable terminal includes a guide member 20, a slide member 30, and a force providing means 40. The guide member 20 is mounted into a receiving space 30b provided on an inner side of the slide member 30 and is engaged by screws with the body housing 2 of the terminal so that the slide member 30 is slidable. At least one screw engaging portion 21 is provided in the guide member 20 so that the guide member 20 is engaged with the body housing 2 by screws. The receiving space 30b is formed on the inner side of the slide member 30 so as to receive the guide member 20 in an opposite manner. Both surfaces of the guide member 20 and the inner surface of the receiving space 30b slide relatively with respect to each other. The force provided means 40 is provided between the guide member 20 and the slide member 30 so that it can provide forces for slidably moving the slide member 30.

As shown in FIGS. 4 and 9 to 11, guide recesses 22 are formed at both ends of the guide member 20, so that guide rails 32 formed in the slide member 30 can be guided thereby. The guide recesses 22 have a U-shaped side cross-section. Further, as shown in FIG. 4 and. 6, the guide rails 32 are formed at both ends of the slide member 30 so as to slide with respect to the guide recesses 22 of the guide member 20.

Figure 6:
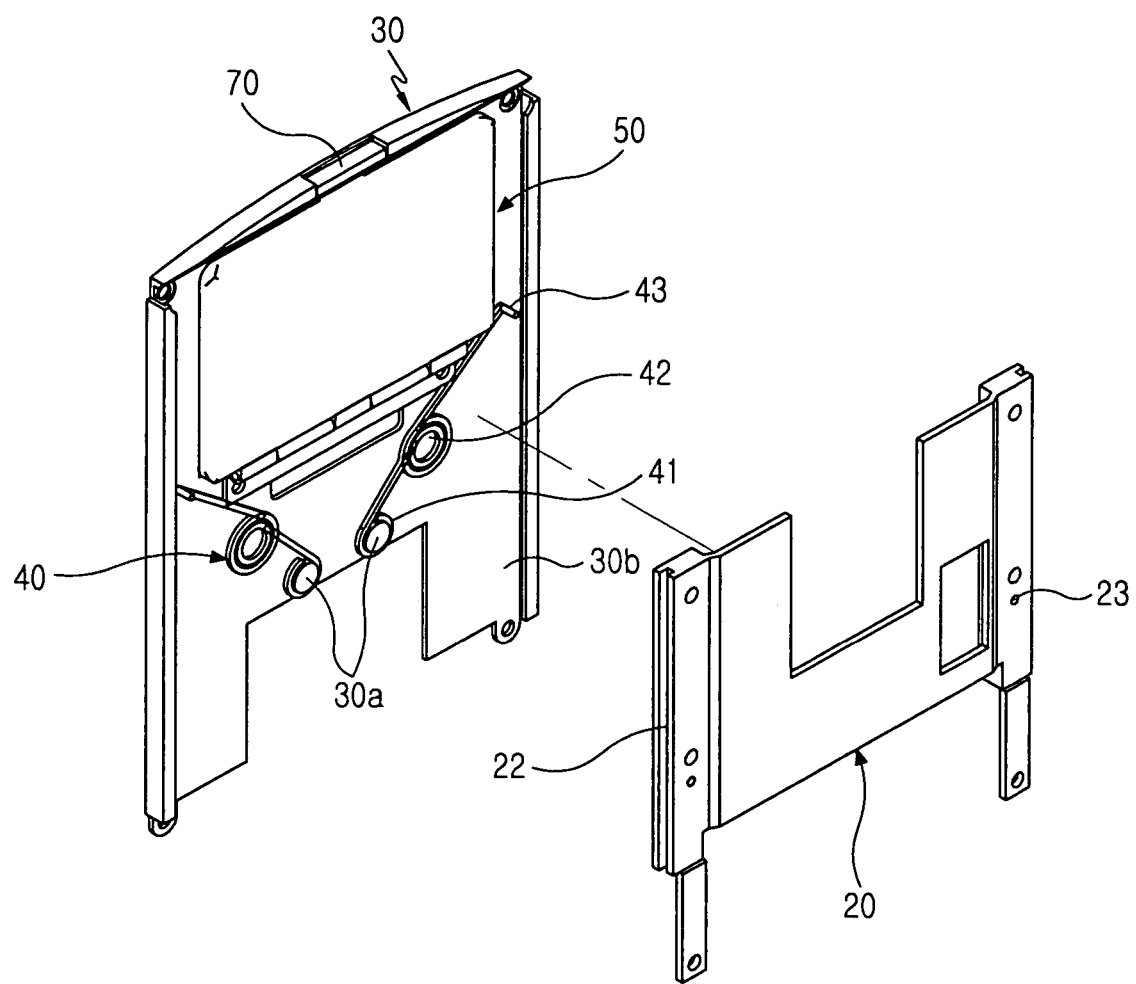
FIG. 6 is an exploded perspective view showing the structures of a slide module of a slide type portable terminal and a cover apparatus of an external type card mounted thereto according to the present invention before a guide member is assembled.

Further, as shown in FIGS. 3 and 6, the force providing means 40 includes a pair of torsion springs 40. A free end 43 is provided at one end of each torsion spring 40 so as to be engaged with a fixing hole 23 formed in the guide member 20. The central portion of the torsion spring 40 is rotated in a predetermined locus to provide a resilient force so that the slide member 30 slides. A fixing end 41 is provided at the other end of the torsion spring 40 and is engaged with a spring engaging member 30a formed in the slide member 30 so as to slide together with the slide member 30.

Figure 10:
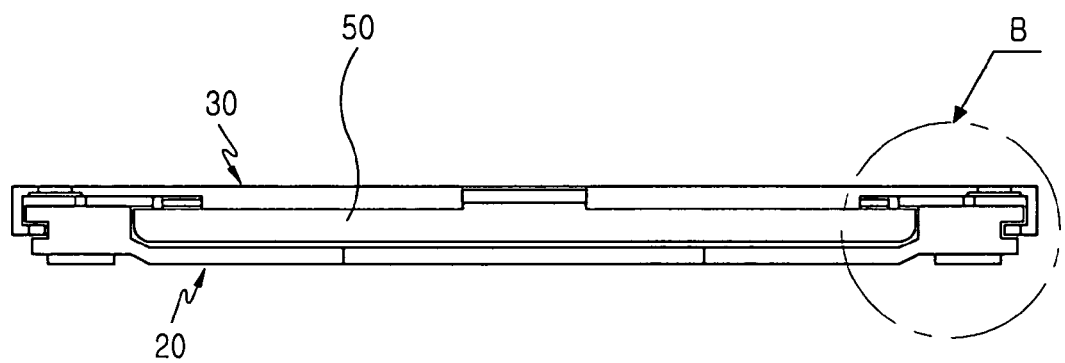
FIG. 10 is a cross-sectional view taken along a line A-A' of FIG. 9.
Figure 11:
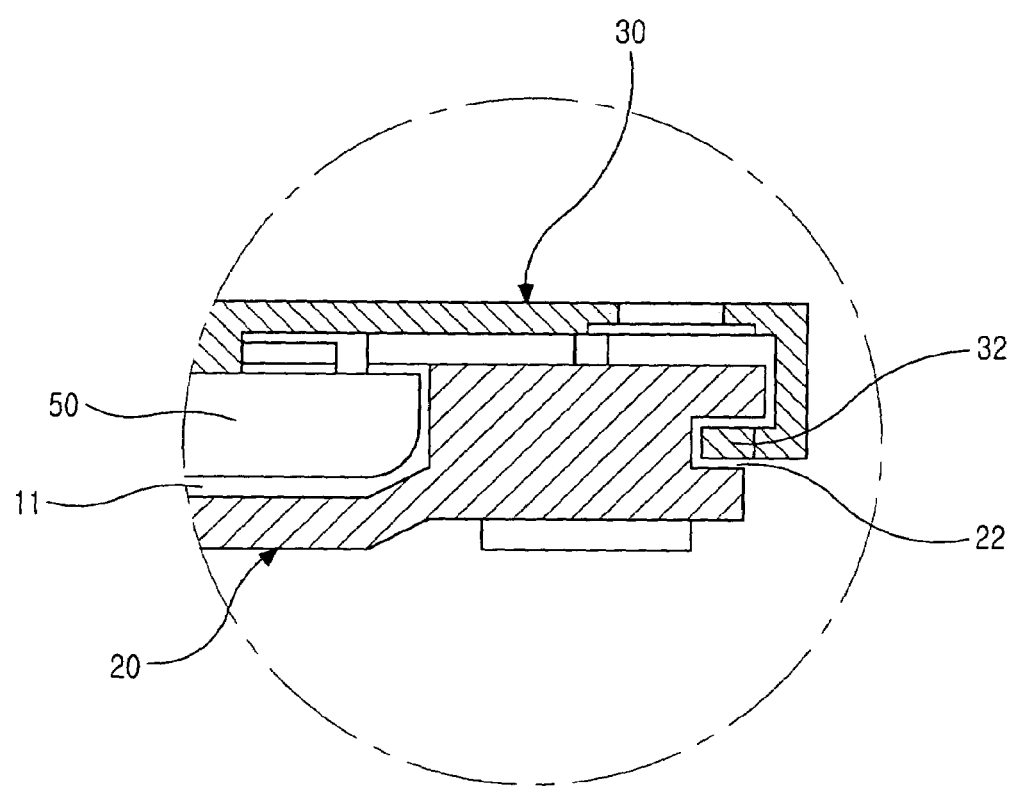
FIG. 11 is a enlarged cross-sectional view for showing portion B of FIG. 10.

Hereinafter, the operation of the slide module of the slide type portable terminal according to the first preferred embodiment of the present invention will be explained in detail with reference to FIGS. 3 to 14. As shown in FIGS. 3 and 4, the guide member 20 is engaged with the body housing 2 of the terminal by using at least one screw engaging portion 21 formed in the guide member 20. In this state, as shown in FIGS. 9 to 11, the guide member 20 is received in the receiving space 30b formed in the slide member 30, and the guide recesses 22 formed at both side ends of the guide member 20 and the guide rails 32 of the slide member 30 are engaged so that the slide member 30 can slide. Then, as shown in FIG. 6, the free end 43 provided at one end of the torsion spring 40 is inserted into the fixing hole 23 formed in the guide member 20, and the fixing end 41 provided at the other end of the torsion spring 40 is engaged with the spring engaging member 30a formed in the slide member 30.

Figure 12:
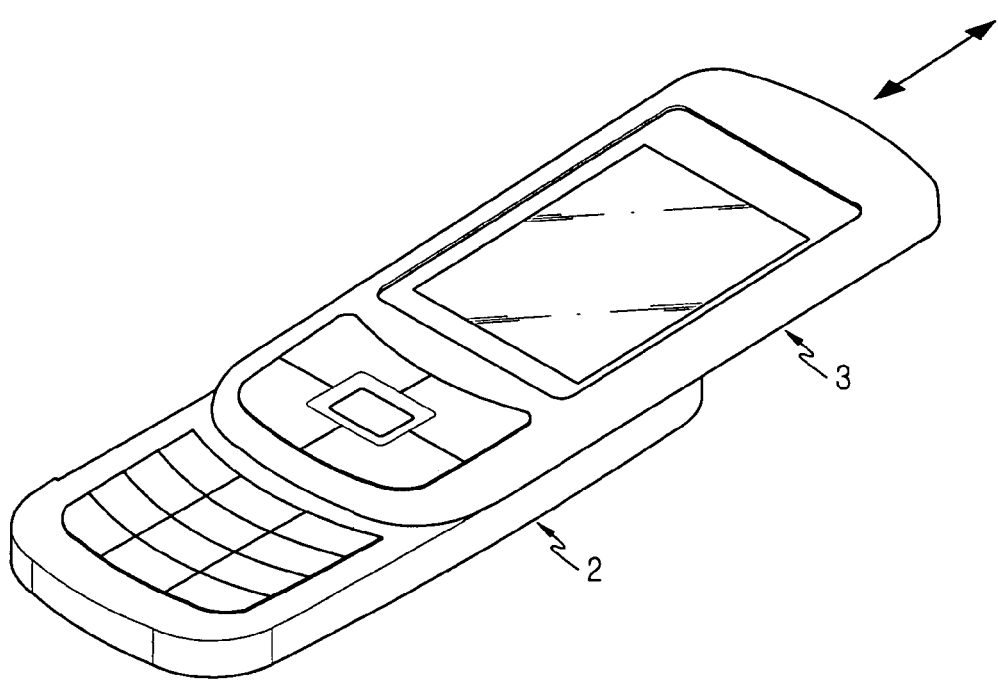
FIG. 12 is a perspective view showing the state after the slide movement of a slide type portable terminal according to the present invention.
Figure 13:
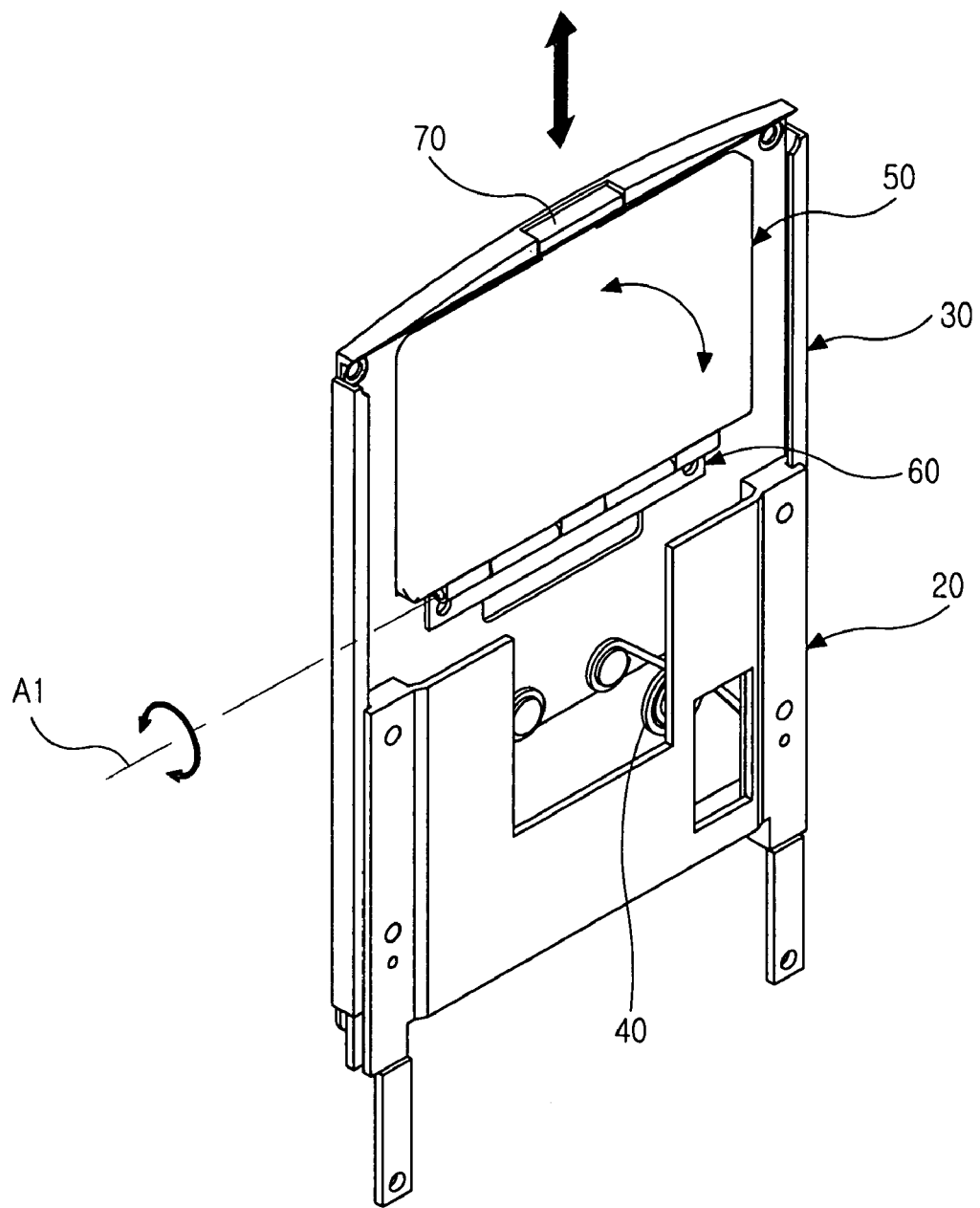
FIG. 13 is a perspective view for showing the state after the operation of a slide module of a slide type portable terminal according to the first preferred embodiment of the present invention.
Figure 14:
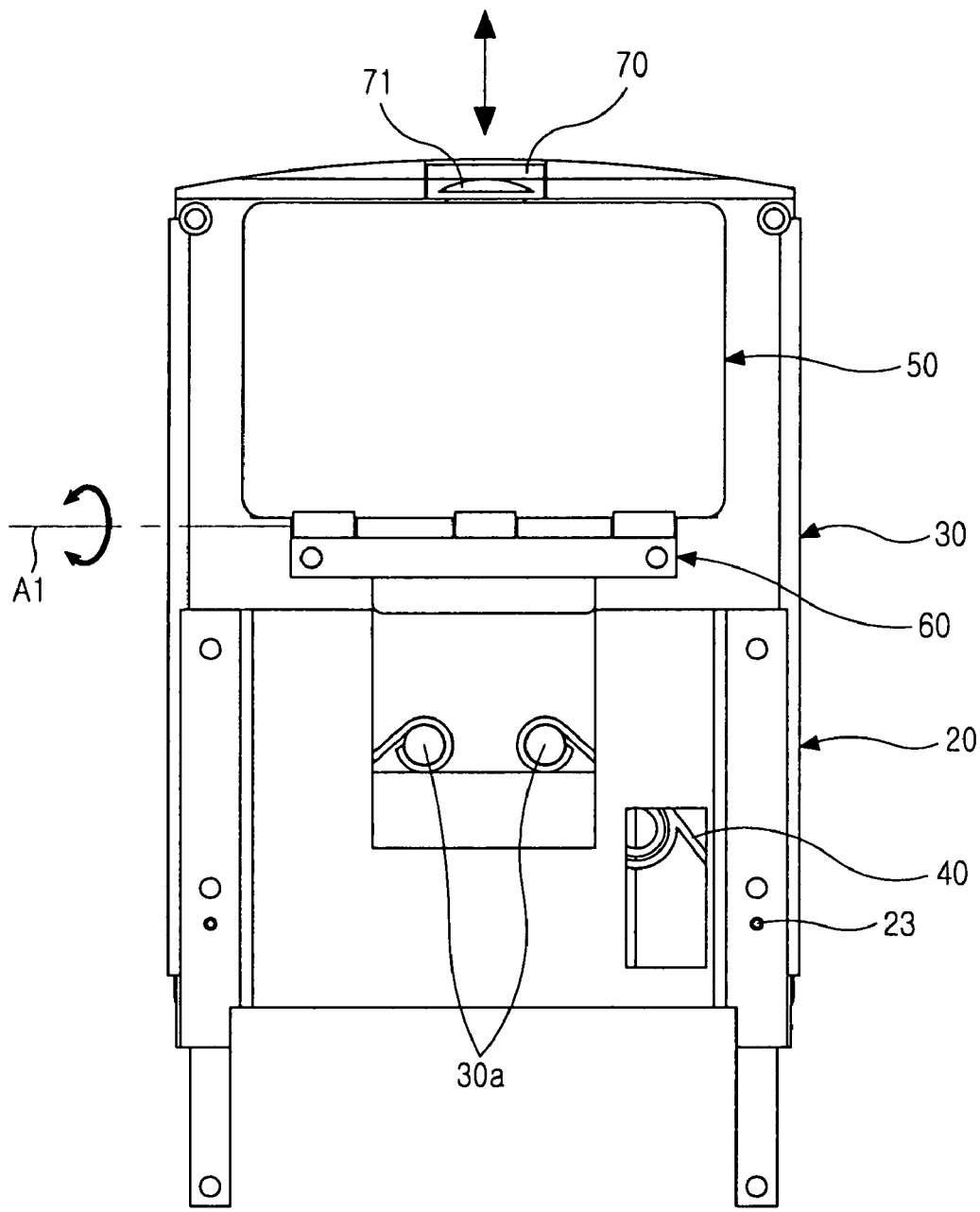
FIG. 14 is a front view showing a state after the operation of a slide module of a slide type portable terminal according to the first preferred embodiment of the present invention.

Here, as shown in FIGS. 12 to 14, if the slide housing 3 is slid with respect to and away from the body housing 2, the slide member 30 slides together with the slide housing 3, as the guide rails 32 of the slide member 30 slide along the guide recesses 22 of the guide member 20. The free ends 43 of the torsion springs 40 also slide, the central portions 42 of the torsion springs 42 rotate in a predetermined loci and provide resilient forces so that the slide member 30 can slide.

Figure 7:
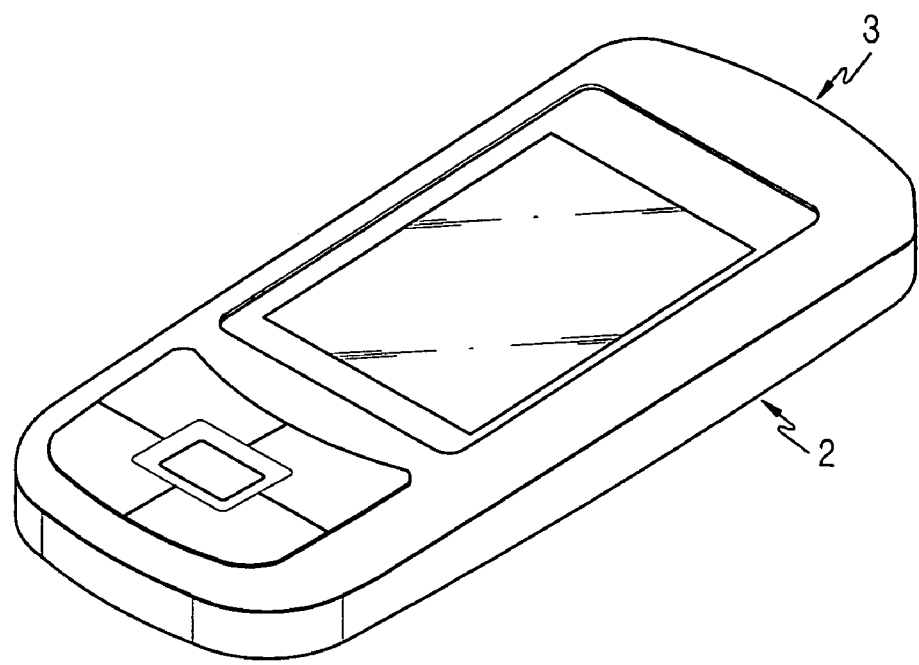
FIG. 7 is a perspective view showing a state before the slide movement of a slide type portable terminal according to the present invention.
Figure 8:
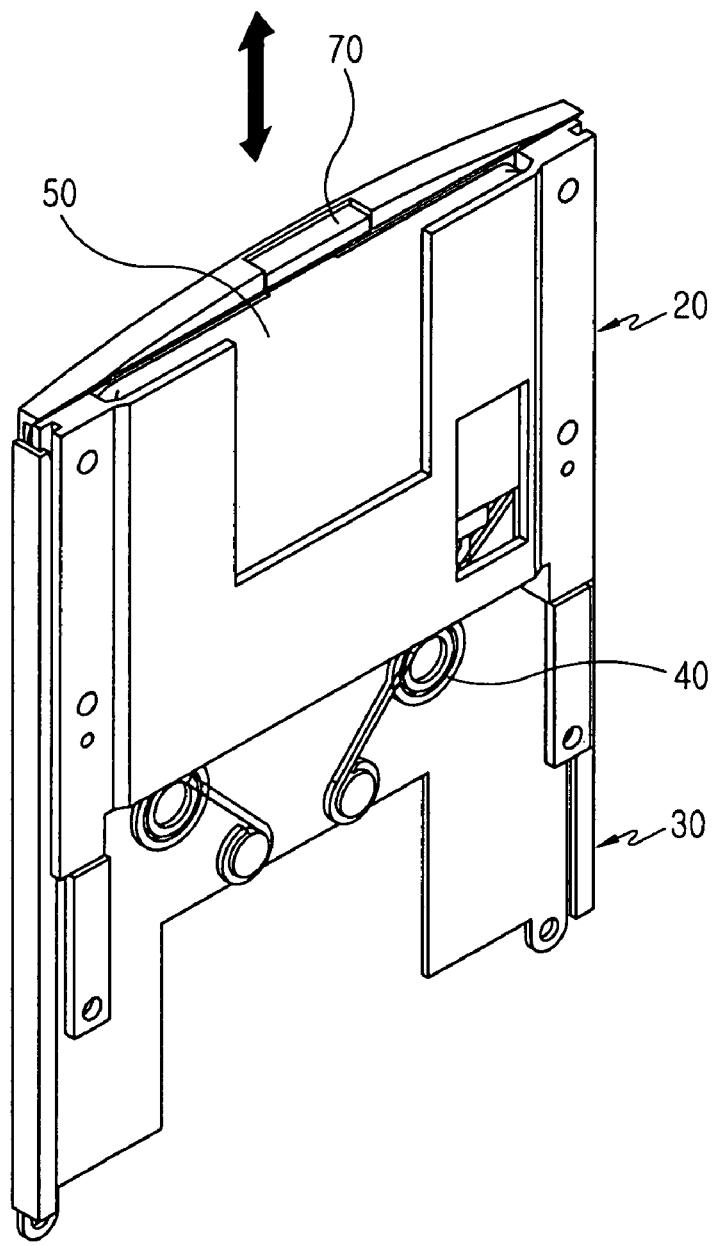
FIG. 8 is a perspective view showing the state before the operation of a slide module of a slide type portable terminal according to a first preferred embodiment of the present invention.
Figure 9:
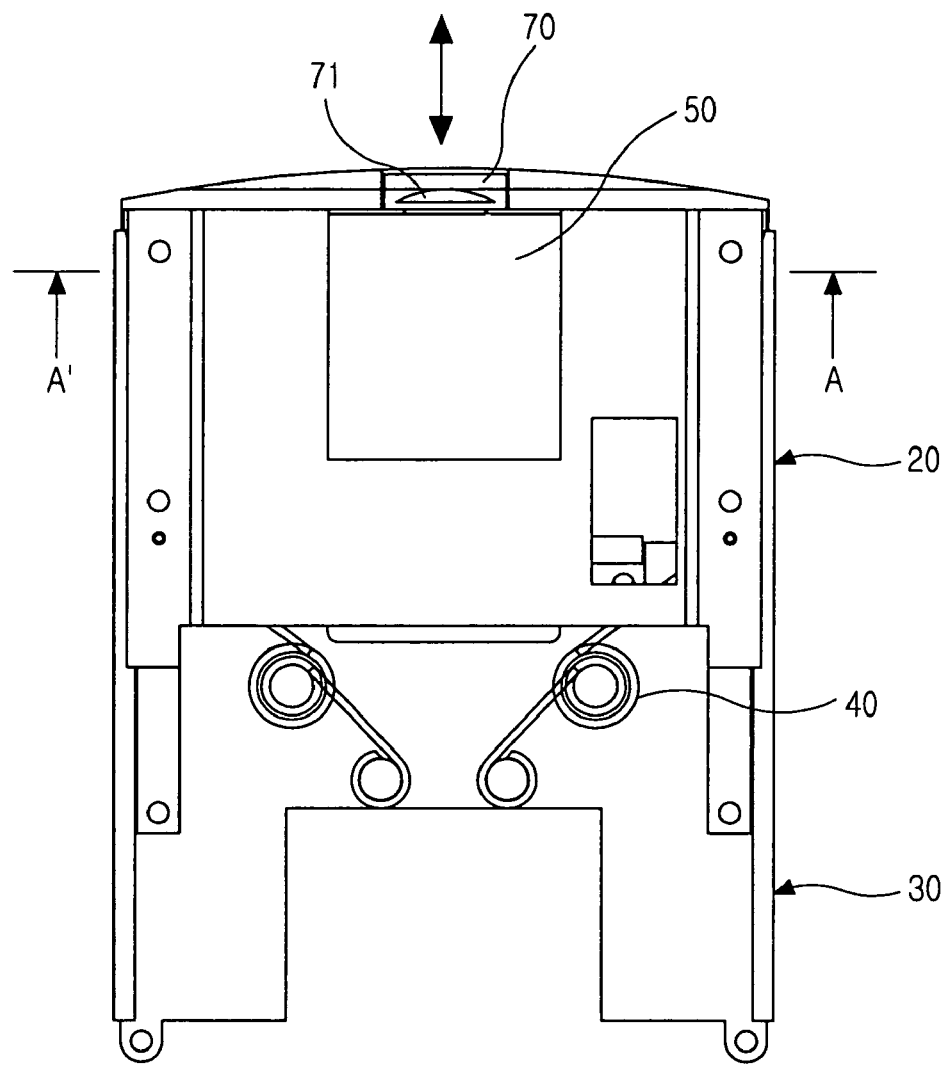
FIG. 9 is a front view showing the state before the operation of a slide module of a slide type portable terminal according to a first preferred embodiment of the present invention.

As shown in FIGS. 7 to 9, if the slide housing 3 slides with respect to and towards the body housing 2, the slide member 30 slides together with the slide housing 3. The guide rails 32 of the slide member 30 also slide along the guide recesses 22 of the guide member 20, while the torsion springs 40 provide resilient forces so that the slide member 30 can slide.

Hereinafter, the operation of a cover apparatus for an external type card mounted to a slide module of a slide type portable terminal according to the second preferred embodiment of the present invention will be explained with reference to FIGS. 3 to 6 and 15 to 18.

Figure 5:
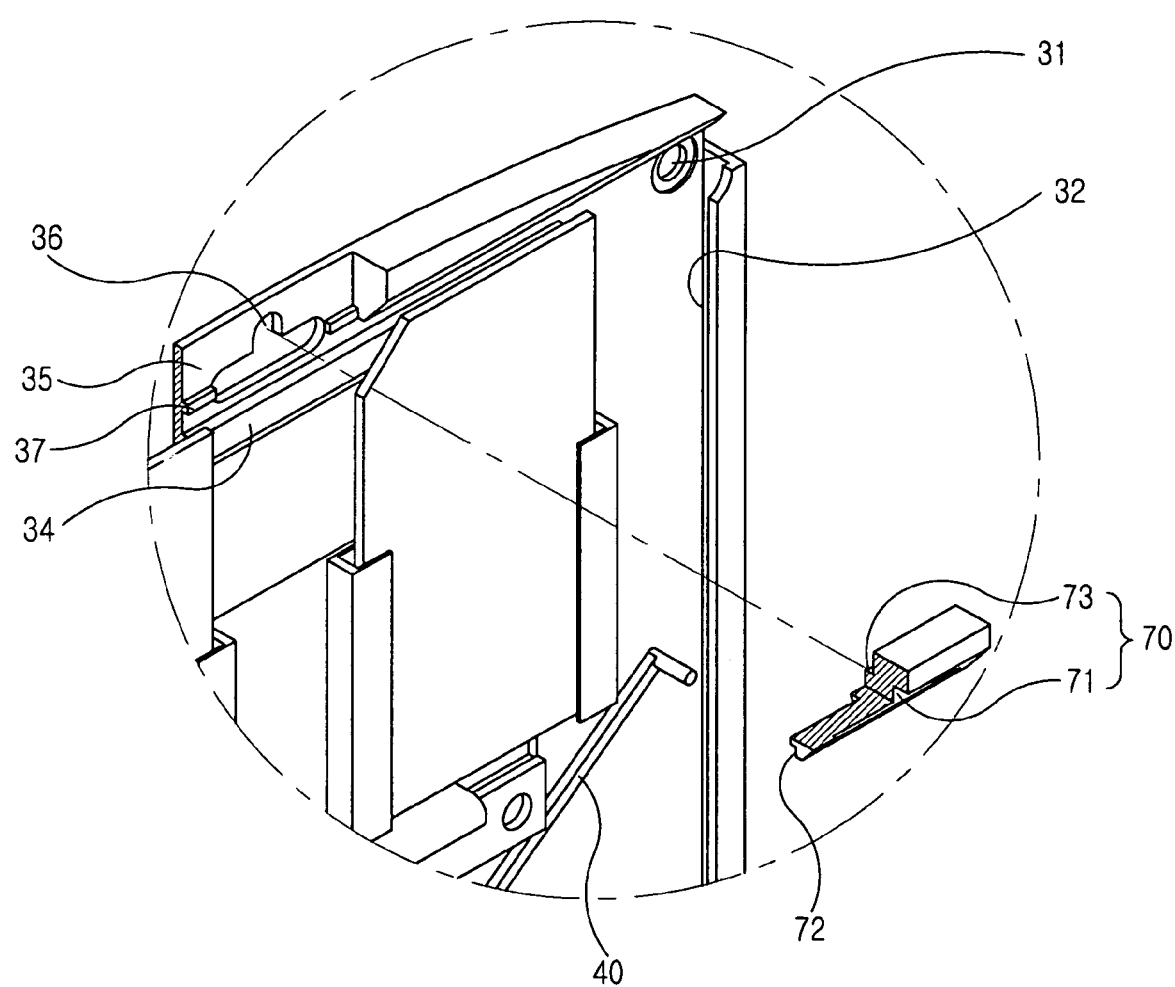
FIG. 5 is an enlarged perspective view for showing portion A of FIG. 4.

As shown in FIGS. 3 to 5, the cover apparatus for the external type card mounted to the slide module 10 of the slide type portable terminal includes an external type card cover 50, a cover hinge unit 60, and a cover locking unit 70 discussed above and as shown in FIG. 3, the slide module 10 includes a guide member 20, a slide member 30, and a torsion spring 40.

As shown in FIGS. 3 to 6 and 15, since a receiving space 11 for receiving the external type card cover 50 is formed in the slide member 30, the external type card cover having a plate shape is provided in the receiving space 11. At least one rotating arm 52 is formed at one end of the external type card cover 50 so as to be rotatably engaged with the cover hinge unit 60. A cover catching member 53 for catching and restricting the cover locking unit 70 is formed at the other end of the external type card cover. In this state, the rotating arm 52 of the external type card cover is rotatably engaged with at least one hinge arm 61 mounted to the slide member 30. The hinge arm 61 is mounted to the slide member 30 and is provided at the hinge support member 62 so that the hinge support member 62 supports the hinge arm 61.

Figure 17:
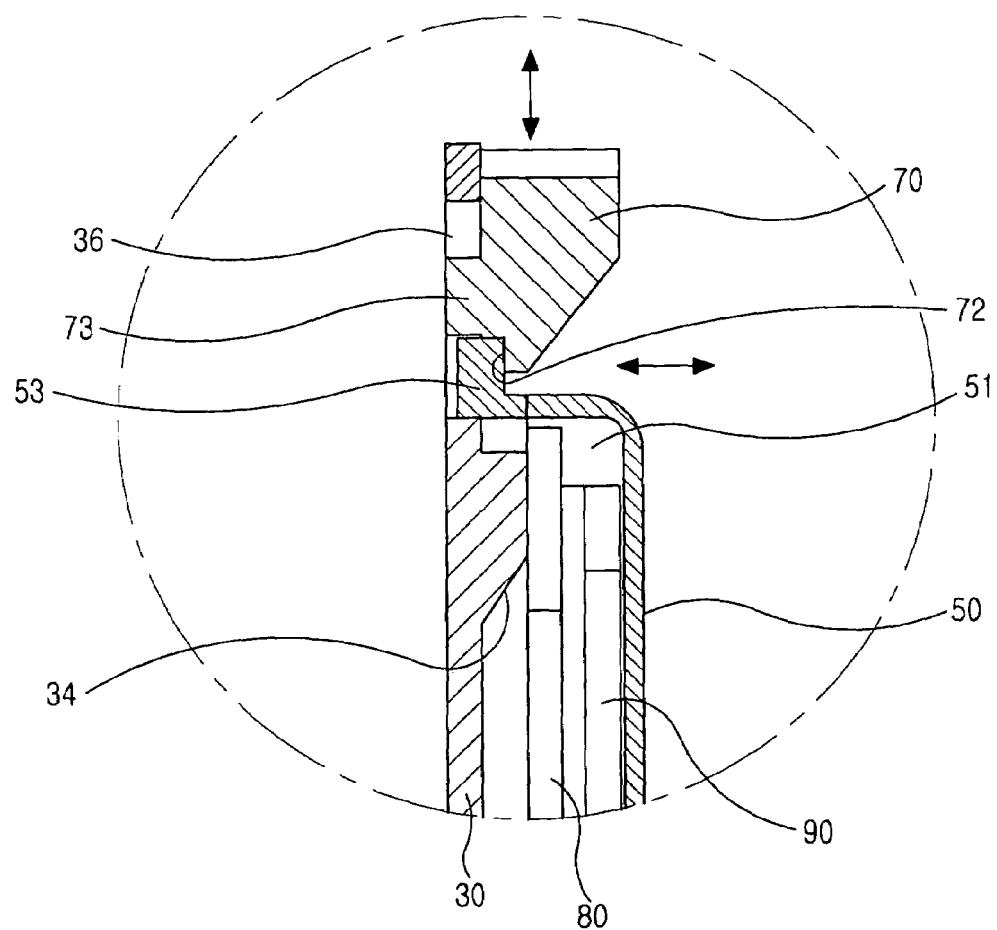
FIG. 17 is an enlarged side cross-sectional view of portion C of FIG. 16, which shows a state before the operation of a cover apparatus of an external type card of the present invention.
Figure 18:
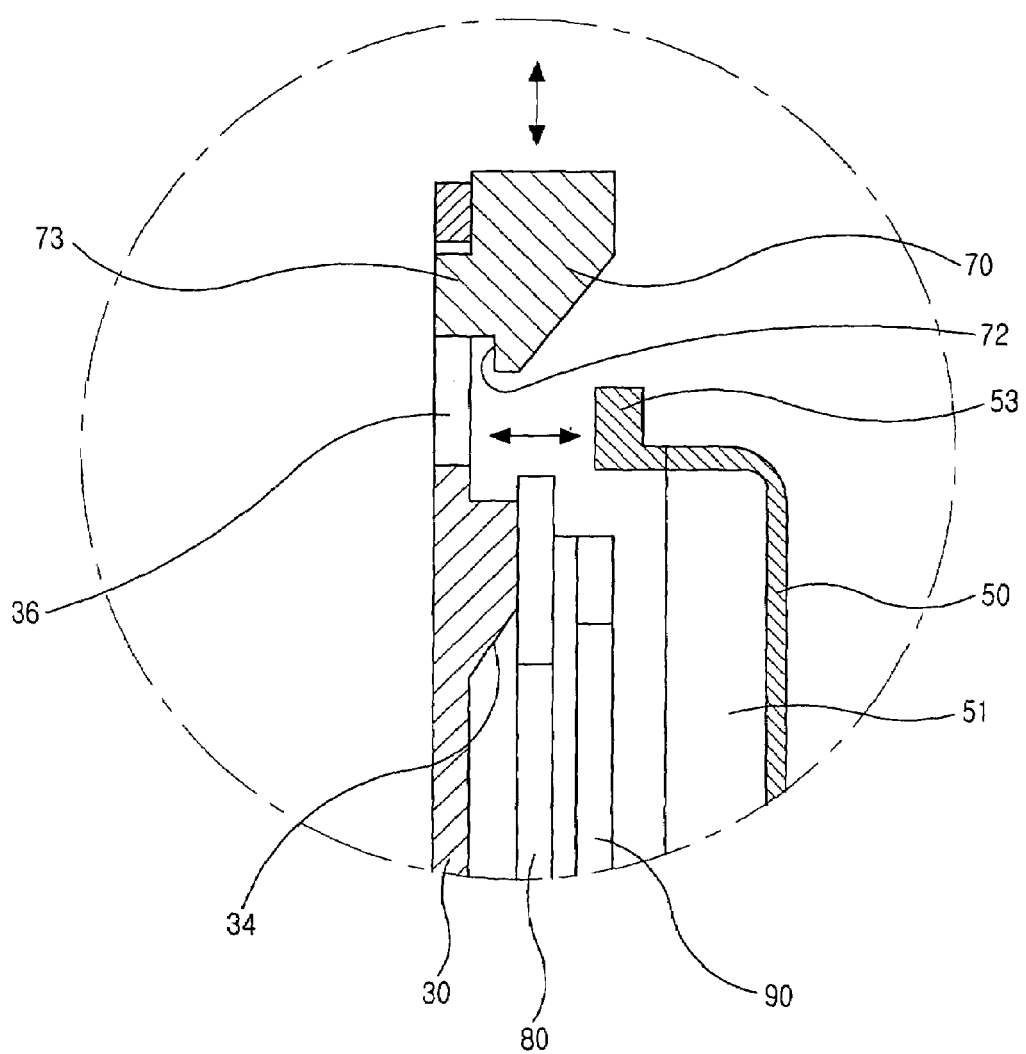
FIG. 18 is an enlarged side cross-sectional view of portion C of FIG. 16, which shows a state after the operation of a cover apparatus of an external type card of the present invention

In this state, the cover locking unit 70 is mounted into a mounting recess 35 (see FIGS. 4 and 5) formed at one end of the slide member 30, and the cover catching member 53 formed in the external type card cover 50 is inserted into a locking portion 72 formed in the cover locking unit 70 and restricts the rotation of the external type card cover, as shown in FIGS. 17 and 18.

Since a guide hole 36 engaged with the cover catching member 53 and guiding the cover catching member 53 so that the catching member 53 can be moved in the upward and downward directions of the cover locking unit 70 is formed in the mounting recess 35, the guide hole 36 engages the cover catching member 53 and guides the cover catching member 53 when the catching member 53 is moved in the upward and downward directions of the cover locking unit 70.

Figure 15:
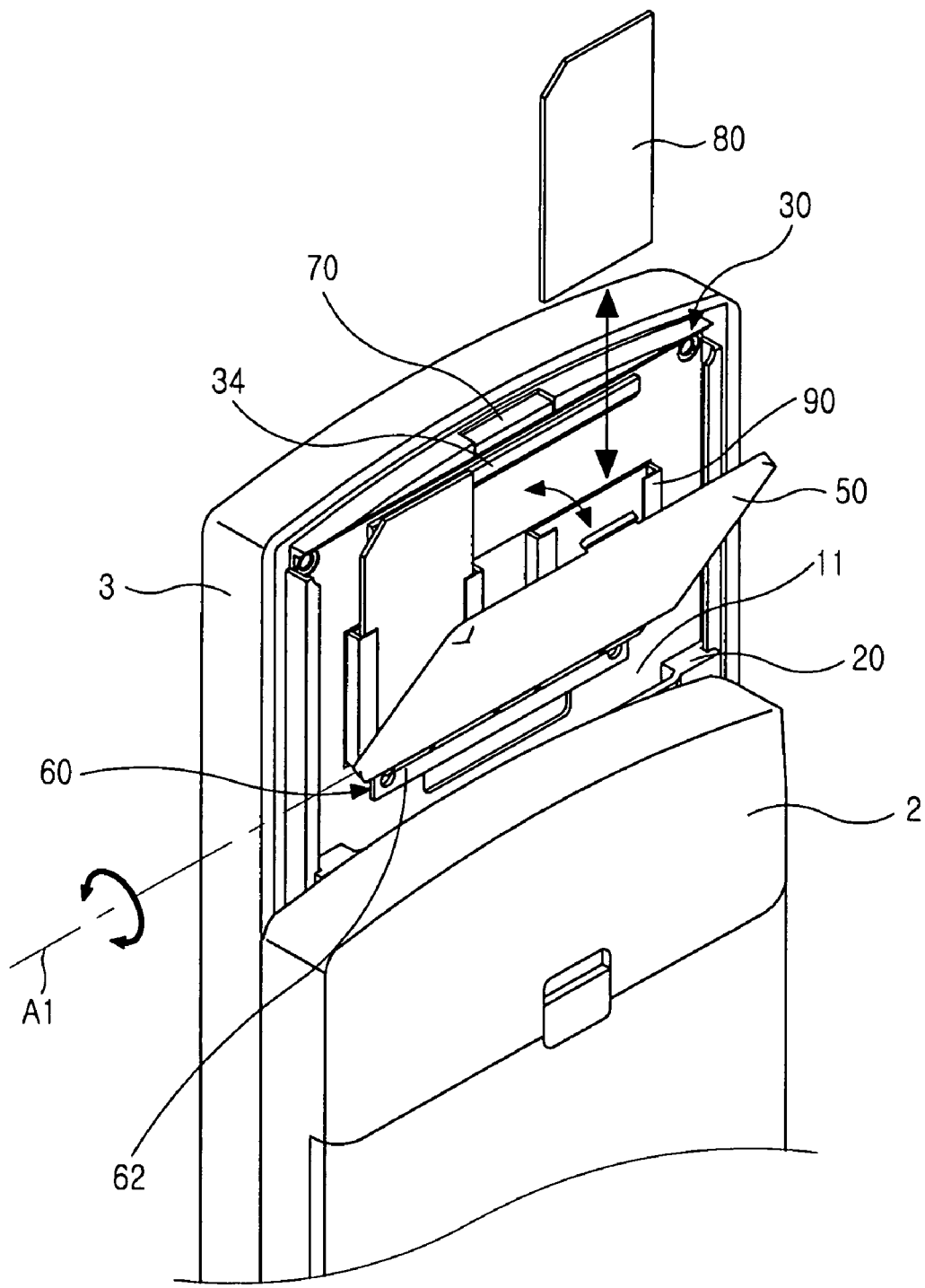
FIG. 15 is a perspective view showing an operational state of a cover apparatus for an external type card mounted to a slide module of a slide type portable terminal according to a second preferred embodiment of the present invention.
Figure 16:
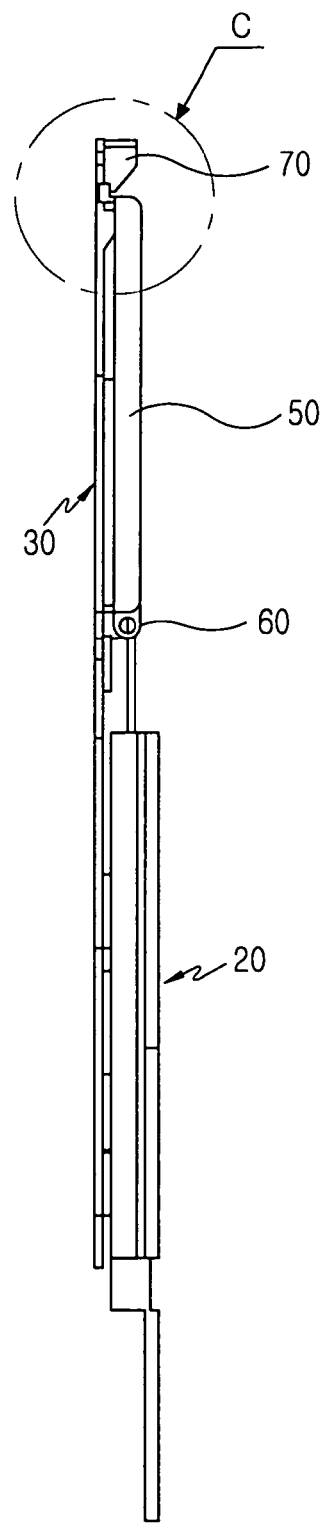
FIG. 16 is a side cross-sectional view showing an operational state of a cover apparatus for an external type card mounted to a slide module of a slide type portable terminal according to the second preferred embodiment of the present invention.

In this state, as shown in FIG. 15, if the slide housing 3 is slid away from the body housing 2, the slide member 30 slides together with the slide housing 3, and the external type card cover is exposed to the outside to the rearward of the terminal.

As shown in FIGS. 14, 17 and 18, if the locker portion 72 is pushed from the lower side to the upper side by using a knob recess 71 of the cover locking unit formed at one end of the slide member 30, the locker portion 72 is pushed up together with the cover locking unit 70 and releases the catching state of the catching member 53 of the card cover 50. A guide boss 73 engaged with the guide hole 36 formed in the mounting recess 35 and moving upward and downward is formed at a position adjacent to the locker portion 72. Then, as shown in FIG. 15, the card cover 50 may be rotated by a predetermined angle about a hinge axis A1 of the cover hinge unit 60.

When the card cover 50 is rotated, a socket 90 of a card 80 provided in the slide housing 3 is accessible. The socket 90 of the card 80 is accessed though a socket hole 33 formed in the slide member 30 and is exposed to the outside, as shown in FIG. 3.

In this state, the external type card may be inserted into or separated from the card socket 90.

As shown in FIG. 15, a socket support member 34 is formed in the slide member 30 so as to support the external type card 80 in a state in which the external type card 80 is engaged with the socket 90.

As shown in FIGS. 15 to 18, by rotating the external type card cover 50 about the hinge axis A1 of the cover hinge unit 60 in an opposite direction, the catching member 53 of the card cover 50 is inserted into the locker portion 72 of the cover locking unit 70 and restricts the card cover 50 in the original state. As shown in FIG. 17, the catching member 53 of the card cover 50 is inserted into the guide hole 36 formed in the mounting recess 35. The locker portion 72 is guided and moved by the guide hole 36 from the upper side to the lower side and is caught by the catching member 53 to restrict the locker portion 72.

Referring back to FIGS. 4 and 5, deviation preventing members 37 for preventing deviation of the cover locking unit 70 from the mounting recess 35 are formed at both ends of the guide hole 36. A card attaching recess 51 for inserting or deviating the socket of the slide housing 3 and the external type card 80 as the card cover 50 is rotated is formed on the inner surface of the external type card cover 50.

In this state, if the slide housing 3 slides toward the body housing 2, the external type card cover 50 slides together with the slide member 30 and is received in the receiving space 11 of the guide member 20.

The external type card cover 50 can be concealed in the inner side of the terminal.

As mentioned above, since an exterior card cover exposed and concealed to and from the outside of the terminal as the slide module slides is provided in a slide type portable terminal, the appearance of the terminal is appealing and the external card can be easily used.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A slide module of a slide portable terminal having a body housing and a slide housing sliding along a longitudinal direction between a closed position and an open position, the slide module comprising:
   a guide member;
   a slide member receiving the guide member in an inner side of the slide member in an opposed manner and engaged with sides of the guide member so as to slide;
   an external card cover for covering an external card removably connected to the slide portable terminal, the external card cover rotating about a hinge axis perpendicular to the longitudinal direction, the external card cover being concealed at the closed position and being exposed at the open position; and
   a cover hinge unit rotatably engaging the external card cover and opening and closing a socket provided in the slide housing as the external card cover is rotated about the hinge axis.

2. A slide module according to claim 1, wherein the guide member is engaged with the body housing of the terminal, and guide recesses are formed at both ends of the guide member so that guide rails fanned in the slide member can be guided thereby.

3. A slide module according to claim 2, wherein the guide recesses have a U-shaped side cross-section.

4. A slide module according to claim 1, further comprising a force providing means provided between the guide member and the slide member, for providing a force to slidably move the slide member.

5. A slide module according to claim 4, wherein the force providing means comprises a pair of torsion springs, a free end is provided at one end of each torsion spring so as to be engaged with the guide member, a central portion of the torsion spring is rotated in a predetermined locus to provide a resilient force so that the slide member slides, and a fixing end is provided at the other end of the torsion spring and is engaged with the slide member so as to slide together with the slide member.

6. A slide module according to claim 1, further comprising:
a cover locking unit for restricting rotation of the external card cover and releasing the restriction.

7. A slide module according to claim 6, wherein a socket hole for accessing the socket and exposing the socket to the outside is formed in die slide member, and a socket support member for supporting a state in which the external card cover is engaged with the socket is formed in the slide member.

8. A slide module according to claim 7, wherein the external card cover has a plate shape, and a card attaching recess for accessing the socket and the external card is formed on an inner side of the external card cover.

9. A slide module according to claim 6, wherein at least one rotating arm is formed at one end of the external card cover so as to be rotatably engaged with the cover hinge unit, and a cover catching member for catching and restricting the cover locking unit is formed at the other end of the external card cover.

10. A slide module according to claim 9, wherein at least one hinge arm rotatably engaged with the at least one rotating arm of the cover is formed in the cover hinge unit, and a hinge support member mounted to the slide member for supporting the at least one hinge arm is provided.

11. A slide module according to claim 9, wherein a mounting recess for mounting the cover locking unit is formed at one end of the slide member, and a guide hole engaged with the cover catching member and guiding the movement of the cover locking unit is formed in a mounting recess, and deviation preventing members for preventing deviation of the cover locking unit in the mounting recess are formed at both ends of the guide hole.

12. A slide module according to claim 11, wherein the cover locking unit comprises a knob recess exposed to the outside, a locker portion formed at a lower portion of the knob recess for catching a catching member of the external card cover to restrict the catching member and releasing the restriction as moved to the upper or lower side, a guide boss formed at a position adjacent to the locker portion, engaged with the guide hole, and guided by the guide hole.

13. A portable communication terminal having a body housing and a slide housing sliding along a longitudinal direction between a closed position and an open position, the portable communication terminal comprising:
a guide member;
a slide member receiving the guide member in an inner side of the slide member in an opposed manner and engaged with sides of the guide member so as to slide;
an external card cover for covering an external card removably connected to the slide portable terminal, the external card cover rotating about a hinge axis perpendicular to the longitudinal direction, the external card cover being concealed at the closed position and being exposed at the open position; and
a cover hinge unit rotatably engaging the external card cover and opening and closing a socket provided in the slide housing as the external card cover is rotated about the hinge axis.

14. A portable communication terminal according to claim 13, wherein the guide member is engaged with the body housing of the terminal, and guide recesses are formed at both ends of the guide member so that guide rails formed in the slide member can be guided thereby.

15. A portable communication terminal according to claim 14, wherein the guide recesses have a U-shaped side cross-section.

16. A portable communication terminal according to claim 13, further comprising a force providing means provided between the guide member and the slide member, for providing a force to slidably move the slide member.

17. A portable communication terminal according to claim 16, wherein the force providing means comprises a pair of torsion springs, a free end is provided at one end of each torsion spring so as to be engaged with the guide member, a central portion of the torsion spring is rotated in a predetermined locus to provide a resilient force so that the slide member slides, and a fixing end is provided at the other end of the torsion spring and is engaged with the slide member so as to slide together with the slide member.

18. A portable communication terminal according to claim 13, further comprising:
a cover locking unit for restricting rotation of the external card cover and releasing the restriction.

19. A portable communication terminal according to claim 13, wherein a socket hole for accessing a socket of the slide housing and exposing the socket to the outside is formed in the slide member, and a socket support member for supporting a state in which the external card cover is engaged with the socket is formed in the slide member.

20. A portable communication terminal according to claim 19, wherein the external card cover has a plate shape, and a card attaching recess for accessing the socket and the external card is formed on an inner side of the external card cover.

21. A portable communication terminal according to claim 18, wherein at least one rotating arm is formed at one end of the external card cover so as to be rotatably engaged with the cover hinge unit, and a cover catching member for catching and restricting the cover locking unit is formed at the other end of the external card cover.

22. A portable communication terminal according to claim 21, wherein at least one hinge arm rotatably engaged with the at least one rotating arm of the cover is formed in the cover hinge unit, and a hinge support member mounted to the slide member for supporting the at least one hinge arm is provided.

23. A portable communication terminal according to claim 21, wherein a mounting recess for mounting the cover locking unit is formed at one end of the slide member, and a guide hole engaged with the cover catching member and guiding the movement of the cover locking unit is formed in a mounting recess, and deviation preventing members for preventing deviation of the cover locking unit, in the mounting recess are formed at both ends of the guide hole.

24. A portable communication terminal according to claim 23, wherein the cover locking unit comprises a knob recess exposed to the outside, a locker portion formed at a lower portion of the knob recess for catching a catching member of the external card cover to restrict the catching member and releasing the restriction as moved to the upper or lower side, a guide boss formed at a position adjacent to the locker portion, engaged with the guide hole, and guided by die guide hole.

* * * * *